United States Patent [19]

Bagaglio et al.

[11] Patent Number: 4,678,513
[45] Date of Patent: Jul. 7, 1987

[54] POLYOL COMPOSITIONS CONTAINING MOULD RELEASE AGENT

[75] Inventors: Giancarlo Bagaglio, Brussels; Jan V. Assche, Steenhuffel; Arun Watts, Brussels, all of Belgium

[73] Assignee: Imperial Chemical Industries plc, London, United Kingdom

[21] Appl. No.: 902,030

[22] Filed: Aug. 25, 1986

Related U.S. Application Data

[63] Continuation of Ser. No. 707,839, Mar. 4, 1985, abandoned.

[30] Foreign Application Priority Data

Mar. 14, 1984 [GB] United Kingdom ............... 8406677

[51] Int. Cl.$^4$ ............................................. B28B 7/36
[52] U.S. Cl. ............................ 106/38.22; 106/287.13
[58] Field of Search .................... 106/38.22, 287.13

[56] References Cited

U.S. PATENT DOCUMENTS

| | | |
|---|---|---|
| 3,585,230 | 6/1971 | Woycheshin et al. . |
| 3,883,628 | 5/1975 | Martin .............................. 106/38.22 |
| 4,033,912 | 7/1977 | Kleimann et al. . |
| 4,184,880 | 1/1980 | Huber et al. ...................... 106/38.22 |
| 4,379,100 | 4/1983 | Salisbury et al. . |
| 4,420,570 | 12/1983 | Dominguez . |

FOREIGN PATENT DOCUMENTS

| | | |
|---|---|---|
| 1474968 | 5/1977 | United Kingdom . |
| 1519518 | 7/1978 | United Kingdom . |
| 1547311 | 6/1979 | United Kingdom . |

Primary Examiner—Amelia B. Yarbrough
Attorney, Agent, or Firm—Cushman, Darby & Cushman

[57] ABSTRACT

Polyol compositions containing siloxane mould release agents, the latter being stabilized by a poly (ethyleneoxide) surfactant, useful in RIM processing of polyurethanes.

4 Claims, No Drawings

POLYOL COMPOSITIONS CONTAINING MOULD RELEASE AGENT

This is a continuation of application Ser. No. 707,839, filed Mar. 4, 1985, which was abandoned upon the filing hereof.

This invention relates to polyol compositions and more particularly to polyol compositions containing mould release agents and to their use in the manufacture of polyurethanes.

It is known to make moulded polyurethane articles by introducing into a mould a reaction mixture containing an organic polyisocyanate, a polymeric polyol and other ingredients which may include blowing agents, catalysts, foam stabilisers, fillers, chain extenders and fire-retardants. The reaction injection moulding (RIM) process is one such method of making moulded polyurethanes. Because of the highly adherent nature of polyurethane reaction mixtures, it is necessary to employ a mould release agent to facilitate removal of the polyurethane product from the mould. Such an agent may either be applied to the mould surface external mould release agents) or be incorporated in one of the components of the reaction mixture (internal mould release agents) or both.

Internal mould release agents that have been proposed for use in polyurethane formulations include polysiloxanes. In order to incorporate the polysiloxane in the reaction mixture, it is convenient to include in one of the major components, especially the polymeric polyol. In general, however, polysiloxanes are insufficiently soluble in the polymeric polyols and do not form stable dispersions therein. Accordingly, polyol compositions containing polysiloxane release agents quickly separate into two layers and need to be homogenised before being used in the moulding process.

It has now been found that substantially stable dispersions of polysiloxanes in polyols can be prepared with the aid of certain non-ionic surfactants.

Accordingly, the invention provides a stable polyol composition comprising a polymeric polyol having a molecular weight of 400 to 10000, a polysiloxane mould release agent and a stabilising amount of an ethylene oxide based surfactant.

For the purpose of the invention, the description of the polyol compositions as stable means that after preparation they remain substantially homogeneous for at least four weeks.

Polymeric polyols which may be present in the polyol compositions of the invention include those which have been used or proposed for use in polyurethane manufacture, especially the relatively high molecular weight, low hydroxyl number polyols suitable for flexible foam and foamed or unfoamed elastomer manufacture. In particular, there may be mentioned polyether polyols, especially polyoxypropylene and poly(oxypropylene-oxyethylene)diols and triols having hydroxyl equivalent weights of from 750 to 3000 and mixtures thereof.

Polysiloxane mould release agents which may be used include those described in the prior art which may or may not contain isocyanate-reactive groups. Suitable polysiloxanes containing isocyanate-reactive groups include polymers which consist essentially of 0.5-20 mol % of $R_aR'_bSiO_{[4-(a+b)]/2}$ units and from 99.5-80 mol % of $R''_cSiO_{(4-c)/2}$ units
where R is an isocyanate reactive organic radical,
a has an average value of from 1-3,
R' and R" are hydrocarbon radical or a substituted organic radical,
b has an average value of 0-2,
a+b is from 1-3,
c has an average value from 1 to 3.

In the above formula, the following features are also desirable separately or in combination:
(a) the ratio of the total molecular weight to the total number of isocyanate reactive functional groups in the polysiloxane molecule (equivalent weight) ranges from 100-3500;
(b) the combined formula weights of all isocyanate reactive organic radicals, R do not exceed 40% of the total molecular weight of the polysiloxane mould release agent;
(c) the combined formula weights of all non-isocyanate reactive radicals, R'+R" together do not exceed 40% of the total molecular wieght of the polysiloxane mould release additive;
(d) the combined formula weights of all the organic radicals R+R'+R" in the molecule together do not exceed 55-60% of the total molecular weight of the molecule;
(e) the polysiloxane mould release agent(s) each contain an average of at least two isocyanate reactive functional groups per molecule;
(f) at least two of the isocyanate reactive functional groups in each molecule are located on separate organic radicals, R, attached independently to different silicon atoms in the polysiloxane molecule;
(g) the isocyanate reactive functional groups which may be employed in the polysiloxane molecule(s) are preferably of the following types:
 1. alcohols,
 2. phenols,
 3. thiols,
 4. primary or secondary aromatic amines, which contain no oxygen, and have not more than one nitrogen atom attached directly to, in conjugation with, or incorporated within, the aromatic ring nucleus,
 5. secondary aliphatic amines wherein at least one the alkyl carbon atoms, bonded directly to the nitrogen atom, is not a primary carbon atom,
 6. carboxylic acids.
(h) the molecular weight of the polysiloxane mould release agent is between 1000 and 30.000, preferably 2000-15.000 and most preferred 4000-8000;

In these mould release agents the hydroxy, mercapto, or amino organic R radicals, having preferably a molecular weight in the range of 100-400, can be attached to the silicon atom directly to carbon or through oxygen, nitrogen or sulfur carbon bonds. Particularly preferred R radicals are those of the formula $HO-R'''-$, $H_2N-R'''-$, $HNR_2'''$, $HS-R'''-$, wherein R''' is a divalent linking group composed of carbon and hydrogen; carbon, hydrogen and oxygen; carbon, hydrogen and sulfur; carbon, hydrogen and nitrogen; or carbon, hydrogen, oxygen and nitrogen. Specific examples of R''' include the methylene, ethylene, propylene, hexamethylene, decamethylene, $-CH_2CH(CH_3)-CH_2-$, phenylene, butyl phenylene, naphthylene, $-CH_2CH_2SCH_2CH_2-$, $-CH_2CH_2OCH_2-$, $-CH_2CH_2-CH_2-O(CH_2-CHR'O)_n-$, where n is 0-5 where R' is described as above or H, a preferred R group is $-CH_2CH_2CH_2O(CH_2CH(CH_3)O)_nH$ where n=1-5 having an hydroxyl equivalent weight of 500-2000. It is preferred that the R''' linking group contains from 3–10 atoms in addition to hydrogen atoms. There can be from 1–33 functional R radicals, preferably 3–10, and from 1–3 attached to a silicon atom.

As indicated above, the R' radical can be any hydrocarbon or substituted organic radical. Illustrative of the R' radicals that can be present are alkyl radicals such as the methyl, ethyl, propyl, butyl amyl, hexyl, octyl, decyl, dodecyl, and octadecyl, and myristyl radicals, alkenyl radicals such as the vinyl, allyl, and hexenyl radicals; cycloalkyl radicals such as the cyclobutyl and cyclohexyl radicals; aryl radicals such as the phenyl, xenyl and naphthyl radicals; aralkyl radicals such as the benzyl and 2-phenylethyl radicals; alkaryl radicals such as the tolyl, xylyl and mesityl radicals; the corresponding halohydrocarbon radicals such as 3-chloropropyl, 4-bromobutyl, 3,3,3-trifluoropropyl, chlorocyclohexyl, bromophenyl, chlorophenyl, alpha, alphatrifluorotolyl and the dichloroxenyl radicals; the corresponding cyanohydrocarbon radicals such as 2-cyanoethyl, 3-cyanopropyl and cyanophenyl radicals; the corresponding radicals such as ether and ester hydrocarbon radical such as $-(CH_2)_3OC_2H_5$, $-(CH_2)_3OCH_3$, $-(CH_2)_3COOC_2H_5$, and $(CH_2)_3COOCH_3$, the corresponding thioether and thioester hydrocarbon radicals such as $-(CH_2)_3SC_2H_5$ and $-(CH_2)_3COSCH_3$ and nitrohydrocarbon radical such as the nitrophenyl and 3-nitro-propyl radicals. It is preferred that the R' radical be an organic radical containing from 1 to 10 atoms. In the most preferred embodiment of this invention at least 90 percent of all the R' radicals are methyl radicals. There can be an average of from 0 to 2 R' radicals attached to the silicon atom, i.e., b has an average of from 0 to 2 in the above formula.

The R'' radical in the functional isocyanate reactive siloxanes of this invention can also be any hydrocarbon or substituted hydrocarbon radical. The illustrative examples given with respect to R' above are equally applicable here and are not repeated for the sake of brevity. Likewise, the preferences set forth for R' above also apply to the R'' radical. There can be from 0 to 3 R'' radicals, on the average, per silicon atom, i.e., c has an average value of from 1 to 3 in the above formula.

These polysiloxane mould release agents are made by well known techniques and are usually formed by grafting an olefin containing organic modifying group or polyoxyalkylene oxide into a "methylhydrogen siloxane" modified polydimethylsiloxane using a platinum catalyzed hydrolisation reaction.

The functional siloxanes of the mould release agent can be either solid or liquid in form. In order to use a solid functional siloxane it would be necessary to dissolve, disperse or suspend the siloxane in one or more silicone surfactants. Hence it is much preferred that the functional siloxane employed be in liquid form. While the viscosity of the liquid siloxane can vary over a wide range, for example from 1 to 100.000 cs., it is generally preferred that the viscosity be in the range of from 50 to 1000 cs. Molecular weight can vary from 1000 to 30.000, preferably 2000–20,000 and most preferred 4000–8000.

The compositions of the invention include a polysiloxane such as those included in the above described definition and specifically but not limited to those in the following list having $R_aR'_bSiO_{[4-(a+b)]/2}$ units and $R''_cSiO_{[4-c]/2}$ units and wherein the value listed for (d) is the equivalent weight, (e) are the combined formula weights or reactive radicals R expressed as percent of the molecular weight, (f) is the combined formula weights of non-isocyanate reactive groups R'+R'' expressed as percent of the molecular weight:

"Polysiloxane I" is a hydroxy functional polysiloxane polyether copolymer internal mould release agent having the approximate formula

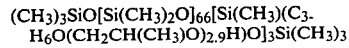
$(CH_3)_3SiO[Si(CH_3)_2O]_{66}[Si(CH_3)(C_3H_6O(CH_2CH(CH_3)O)_{2.9}H)O]_3Si(CH_3)_3$ having a molecular weight of about 6000, a hydroxy equivalent weight (d) of 2000, (e) is 13%, (f) is 35%, and a viscosity of 160 centistokes which is commercially available.

"Polysiloxane II" is a hydroxy functional thioether copolymer internal mould release agent having the speculative formula:

$[HOCH_2CH_2SCH_2CH_2CH_2(CH_3)_2SiO][Si(CH_3)_2O]_{65}[Si(CH_3)_2CH_2CH_2CH_2SCH_2CH_2OH]$ having a hydroxy equivalent weight (d) of 2750, a molecular weight of 5500, a value for (e) of 4.7%, (f) is 37% and a viscosity of about 55 centistokes.

"Polysiloxane III" has a general formula as follows:

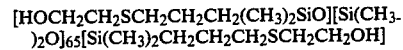
$(CH_3)_3SiO[Si(CH_3)_2O]_{134}[Si(CH_3)(C_3H_6OC_2H_3(OH)CH_2OH)-O]_{16}Si(CH_3)_3$ having a molecular weight of 13,136, (d) equivalent weight of 411, (e) is 16% and (f) is 33%.

"Polysiloxane IV" has a general formula as follows:

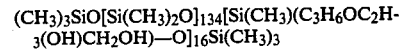
$(CH_3)_3SiO[Si(CH_3)_2O]_{63}[Si(CH_3)(C_3H_6OC_2H_3(OH)CH_2OH)-O]_7Si(CH_3)_3$ having a molecular weight of 6154, (d) equivalent weight 440, (e) is 15%, and (f) is 34%.

"Polysiloxane V" has a general formula:

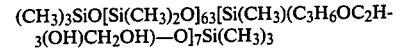
$(CH_3)_3SiO[Si(CH_3)_2O]_{65}[Si(CH_3)(C_3H_6OC_2H_3(OH)CH_2OH)-O]_5Si(CH_3)_3$ having a molecular weight of 6068, (d) equivalent weight 607, (e) is 11%, and (f) is 35%.

"Polysiloxane VI" has a general formula:

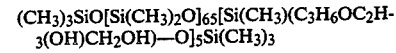
$(CH_3)_3SiO[Si(CH_3)_2O]_{56}[Si(CH_3)C_3H_6O(C_2H_3(OH)CH_2OH)O]_{14}Si(CH_3)_3$ having a molecular weight of 6980, (d) equivalent weight 249, (e) is 26%, and (f) is 28%.

"Polysiloxane VII" has a general formula:

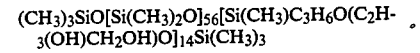
$CH_3CH(OH)CH_2OC_3H_6Si(CH_3)_2O[Si(CH_3)_2O]_{89}Si(CH_3)_2C_3H_6OC_2H_4(OH)CH_3$ having a molecular weight of 6982, (d) an equivalent weight of 3481, (e) is 3.7%, and (f) is 39%.

"Polysiloxane VIII" has a general formula:

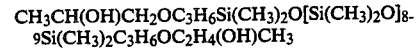
$(CH_3)_3SiO[Si(CH_3)_2O]_{66}[(CH_3)Si(C_4H_8-Ph-NH(C_3H_7)O]_3Si(CH_3)_3$ having a molecular weight of 5782, and equivalent weight (d) of 3481, (e) is 9.9% and (f) is 37% and where pH=phenylene.

"Polysiloxane IX" has a general formula:

(CH₃)₃SiO[Si(CH₃)₂O]₅₅[HOCH₂CHOH-
CHOHCH(CH₂OH)CH(CH₂OH)Si(CH₃)O]₁.₄Si(CH₃)₃ having a molecular weight of 7550, an equivalent weight (d) of 108, (e) is 33% and (f) is 26%.

"Polysiloxane X" has a general formula:

(CH₃)₃SiO[Si(CH₃)₂O]₆₁[(CH₃)Si(C₃H₆OCH₂C-
H(OH)CH₂OH)O]₉Si(CH₃)₃ having a molecular weight of 6390, an equivalent (d) of 355, (e) is 19% and (f) is 32%.

"Polysiloxane XI" has a general formula:

(CH₃)₃SiO[Si(CH₃)₂O]₈₂[Si(CH₃)(C₃H₆O(C₂H₃C-
H₃O)₂C₂H₄CO₂H)O]₃Si(CH₃)₃

The ethylene oxide based surfactants present in the compositions of the invention are well known in the art and are generally compounds in which a polyoxyethylene chain is attached to a hydrophobic residue which may be, for example, a hydrocarbon residue. Thus, suitable surfactants include polyoxyethylene derivatives of the formula:

QO(CH₂CH₂O)ₙH wherein Q represents a hydrophobic residue, for example an alkyl, alkyphenyl or alkanoyl residue, containing from 8 to 30 carbon atoms and n has an average value of from 20 to 150. The most suitable value for n depends to some extent on the nature of the hydrophobic residue Q, a suitable balance between the hydrophilic and hydrophobic moieties of the surfactant molecule being necessary as in other surfactant applications.

The surfactants may be obtained in known manner by reacting ethylene oxide (and optionally propylene oxide) with, for example, aliphatic alcohols, aliphatic carboxylic acids and alkylphenols.

As more specific examples of suitable surfactants, there may be mentioned oxyethylated alkanols obtained by reaction from 40 to 110 moles of ethylene oxide with an alkanol containing from 14 to 20 carbon atoms. Thus, suitable materials include the reaction product of stearyl alcohol with 100 moles of ethylene oxide and the reaction product of tetramethylene glycol butyl ether with 38 moles of propylene oxide and 45 moles of ethylene oxide. There may also be mentioned reaction products of alkylphenols, for example nonylphenols, with at least 20 moles of ethylene oxide.

The compositions of the invention contain a stabilising amount of the surfactant, a stabilising amount being sufficient to provide a stable composition as defined above.

The polyol compositions may be prepared by mixing the polymeric polyol, the polysiloxane mould release agent and the surfactant in a conventional manner. It is often convenient to prepare master batches containing a high concentration of the mould release agent in the polyol and subsequently to blend this master batch with a further amount of polyol and optionally other materials, before polyurethane manufacture. Such master batches typically contain:

Polyol: 100 parts
Mould release agent: 25 parts to 70 parts
Surfactant: 20 parts to 30 parts the parts being expressed on a weight basis. After dilution with polyol, compositions for use in polyurethane manufacture typically contain:

Polyol: 100 parts
Mould release agent: 1 part to 10 parts
Surfactant: 1 part to 5 parts.

In addition to the materials already mentioned, the polyol compositions of the invention may contain other conventional components of polyurethane-forming reaction mixtures except organic polyisocyanates. Thus, the compositions may contain catalysts, for example tertiary amines and tin compounds, fillers, fire retardants, chain extenders, blowing agents, for example water and trichlorofluoromethane, and foam stabilisers.

The polyol compositions of the invention, which are stable for periods of up to four weeks, may be reacted with organic polyisocyanates in known manner and using conventional equipment to form moulded polyurethanes. Suitable polyisocyanates include aromatic polyisocyanates such as diphenylmethane diisocyanate and tolylene diisocyanate, each of which may be used in the various pure, crude and modified forms which have been fully described in the prior art. The compositions of the invention are particularly suitable for use in reaction injection moulding (RIM) processes to form polyurethanes having densities of from 100 to 1200 kg/m³. The polyurethanes have excellent mould release properties.

The invention is illustrated but not limited by the following Examples in which all parts and percentages are by weight.

The Examples illustrated the following aspects of the invention:

Example 1: the identification of stabilising surfactants

Examples 2-7: the preparation of stable masterbatches containing siloxane mould release agents Examples 8-15: the preparation of working polyol compositions containing siloxane mould release agents.

Examples 16-21: the use of polyols with siloxanes in RIM processes

The following surfactants were used in the Examples:

Surfactant A: stearyl alcohol ethoxylated with 100 moles ethylene oxide (BRIJ* 700 from ICI Speciality Chemicals)

Surfactant B: tetramethylene glycol butyl ether alkoxylated with 38 moles propylene oxide and 45 moles ethylene oxide (ATLAS* G5000 from ICI Speciality Chemicals)

Surfactant C: Nonylphenol alkoxylated with 16 moles propylene oxide and 13 moles ethylene oxide. (ATLAS* EL 1019 from ICI Speciality Chemicals)

The following surfactants were tried and found to give inadequate stabilisation:

Surfactant D: stearyl alcohol reacted with 15 moles propylene oxide

Surfactant E: stearyl alcohol reacted with 2 moles ethylene oxide

Surfactant F: stearyl alcohol reacted with 10 moles ethylene oxide

Surfactant G: sorbitan tristearate give inadequate stabilisation: Surfactant D: stearyl alcohol reacted with 15 moles propylene oxide Surfactant E: stearyl alcohol reacted with 2 moles ethylene oxide Surfactant F: stearyl alcohol reacted with 10 moles ethylene oxide Surfactant G: sorbitan tristearate The mould release agent used was "Polysiloxane I" described above.

The polyol used in tests was a propoxylated diethylene glycol (70%), glycerol (30%) having ethylene oxide (20%) tipping, with the properties:

Functionality: 2.2
Equivalent weight: 1750
Hydroxyl value: 30–35 mg KOH/g

The isocyanate used was a blend of SUPRASEC* VM021 (65%) and SUPRASEC* DNR (35%) isocyanates from ICI Polyurethanes.

SUPRASEC* VM021 is a glycol modified diphenyldimethanediisocyanate (MDI) and SUPRASEC* DNR is a polymeric MDI.

BRIJ*, ATLAS* and SUPRASEC* are trademarks, the property of Imperial Chemical Industries PLC and its subsidiary companies.

EXAMPLE 1

Surfactants A–G are blended with the above polyol and siloxane in the following ratio:

Polyol: 63 parts
Surfactant: 10 parts
Siloxane I: 27 parts.

Mixing was by hand with sufficient heat required to melt and mix the components. The resultant mixture was stored at room temperature and examined at intervals. The results are reported in Table 1.

O = homogeneous blend
A = small drops of siloxane separate
B = coalescence of drops
C = partial separation of siloxane to form layer
D = complete separation of siloxane, observation discontinued.

TABLE 1

| Surfactant | Observations after days | | | | | | | | |
|---|---|---|---|---|---|---|---|---|---|
| | 1 | 2 | 3 | 4 | 5 | 7 | 14 | 21 | 28 | 35 |
| A | 0 | 0 | 0 | 0 | 0 | 0 | 0 | 0 | 0 | 0 |
| B | 0 | 0 | 0 | 0 | 0 | 0 | 0 | 0 | 0 | 0 |
| C | 0 | 0 | 0 | 0 | 0 | 0 | 0 | 0 | 0 | 0 |
| D | C | D | | | | | | | | |
| E | D | | | | | | | | | |
| F | B | C | D | | | | | | | |
| G | B | C | D | | | | | | | |

EXAMPLES 2–7

Surfactants A, B and C were made up with polyol and siloxane 1 as masterbatch compositions suitable for dilution with more of the same polyol for use. The stability of the masterbatches at room temperature was assessed. Results are reported in Table 2.

TABLE 2

| Composition | Example No. | | | | | |
|---|---|---|---|---|---|---|
| | 2 | 3 | 4 | 5 | 6 | 7 |
| Polyol | 100 | 100 | 100 | 100 | 100 | 100 |
| Surfactant | | | | | | |
| A | 24 | 26 | — | — | — | — |
| B | — | — | 24 | 26 | 26 | — |
| C | — | — | — | — | — | 26 |
| Siloxane | 39 | 58 | 39 | 59 | 78 | 58 |
| Stability after days | | | | | | |
| 1 | 0 | 0 | 0 | 0 | 0 | 0 |
| 2 | 0 | 0 | 0 | 0 | 0 | 0 |
| 3 | 0 | 0 | 0 | 0 | B | 0 |
| 4 | 0 | B | 0 | 0 | B | 0 |
| 5 | 0 | C | 0 | 0 | B | 0 |
| 7 | 0 | | 0 | 0 | C | 0 |
| 14 | 0 | | 0 | 0 | C | 0 |
| 21 | 0 | | 0 | 0 | C | 0 |
| 28 | 0 | | 0 | 0 | C | 0 |
| 35 | 0 | | 0 | 0 | | |
| 42 | 0 | | 0 | 0 | | |
| 49 | 0 | | 0 | 0 | | |
| 56 | 0 | | 0 | 0 | | |

EXAMPLES 8–14

Working polyol compositions were prepared from the same range of components with lower levels of siloxane and surfactants and stability was similarly assessed. Results are given in Table 3.

TABLE 3

| Composition | Example No. | | | | | | |
|---|---|---|---|---|---|---|---|
| | 8 | 9 | 10 | 11 | 12 | 13 | 14 |
| Polyol | 93.5 | 92.5 | 91 | 92.5 | 92 | 91 | 92.5 |
| Surfactant | | | | | | | |
| A | 1 | 2 | 4 | — | — | — | — |
| B | — | — | — | 2.5 | 3 | 4 | — |
| C | — | — | — | — | — | — | 2.5 |
| Siloxane | 5 | 5 | 5 | 5 | 5 | 5 | 5 |
| Stability after days | | | | | | | |
| 1 | 0 | 0 | 0 | 0 | 0 | 0 | 0 |
| 2 | 0 | 0 | 0 | 0 | 0 | 0 | 0 |
| 3 | 0 | 0 | 0 | 0 | 0 | 0 | 0 |
| 4 | 0 | 0 | 0 | 0 | 0 | 0 | A |
| 5 | 0 | 0 | 0 | 0 | 0 | 0 | B |
| 6 | 0 | 0 | 0 | 0 | 0 | 0 | B |
| 7 | 0 | 0 | 0 | 0 | 0 | 0 | D |
| 14 | A | 0 | 0 | A | 0 | 0 | D |
| 21 | B | 0 | 0 | B | 0 | 0 | D |
| 28 | B | 0 | 0 | B | 0 | 0 | D |
| 35 | B | 0 | 0 | B | 0 | 0 | D |
| 42 | B | 0 | 0 | B | 0 | 0 | D |
| 49 | B | 0 | 0 | B | 0 | 0 | D |
| 56 | B | 0 | 0 | B | 0 | A | D |

EXAMPLE 15

A fully formulated polyol composition for use in RIM processing including catalysts and blowing agent was prepared. To one sample Polysiloxane 1 was added, but to another sample no siloxane was added. Compositions are given in Table 4. Stability is noted.

TABLE 4

| Component | Composition (parts) | |
|---|---|---|
| Polyol | 100 | 100 |
| Surfactant A | — | 2.5 |
| Polysiloxane | 5.8 | 5.8 |
| Ethylene glycol | 26 | 26 |
| Triethylene diamine | 0.5 | 0.5 |
| Fluorocarbon 11 | 6.0 | 6.0 |
| Stability | 2 hours A | 1 month 0 |
| | 4 hours C | |
| | 8 hours D | |

EXAMPLES 16–21

Polyols of the type described in Examples 1 to 15 were reacted with isocyanate (MDI as described above at two levels of isocyanate index) in a RIM machine to assess processability, self release properties and mechanical properties. Compositions and results are repeated in Table 5. For self release properties, a vehicle bumper mould was used. For other mechanical properties a plate mould for producing test pieces was used. Moulds were treated with standard external mould release agents (Chem Trend XMR 136 and XMR 149).

Generally, it is seen that the introduction of the polysiloxane gives a useful increase in the number of mouldings which can be made and the inclusion of surfactant enhances this property as well as stabilising the system. No serious degradation of product properties occurs.

TABLE 5

| Example No. | 16 | 17 | 18 | 19 | 20 | 21 |
|---|---|---|---|---|---|---|
| Polyol | 100 | 100 | 100 | 100 | 100 | 100 |
| Surfactant A | — | — | 2.5 | 2.5 | — | — |
| Surfactant B | — | — | — | — | 4 | 4 |
| Polysiloxane | — | 5.8 | 5.8 | 5.8 | 5.8 | 5.8 |
| Ethylene glycol | 26 | 26 | 26 | 26 | 26 | 26 |
| Triethylene diamine | 0.5 | 0.5 | 0.5 | 0.5 | 0.5 | 0.5 |
| Dibutyltin dilaurate | 0.02 | 0.02 | 0.02 | 0.02 | 0.02 | 0.02 |
| Fluorocarbon 11 | 6 | 6 | 6 | 6 | 6 | 6 |
| Isocyanate expressed as Isocyanate Index (%) | 100 | 100 | 100 | 100 | 100 | 100 |
| Vehicle Bumper Mould | | | | | | |
| DEMOULD TIME | 1'30" | 1'30" | 1'30" | 1'30" | 1'30" | 1'30" |
| DENSITY (Kg/m$^3$) | 780 | 780 | 780 | 780 | 780 | 780 |
| No. OF SELF RELEASING DEMOULDS | 5 | 18 | 22 | 20 | 24 | — |
| Plate Mould | | | | | | |
| MINIMUM DEMOULD TIME | 1'00" | 1'00" | 1'00" | 1'00" | 1'00" | 1'00" |
| DENSITY (Kg/m$^3$) | 1155 | 1160 | 1150 | 1150 | 1120 | 1130 |
| HARDNESS Shore A | 67 | 62 | 62 | 65 | 63 | 65 |
| TENSILE STRENGTH MPa | 29.7 | 30.5 | 28.0 | 31.0 | 27.5 | 30.5 |
| E/B % | 72 | 93 | 85 | 95 | 92 | 90 |
| FLEX. MODULUS MPa | 700 | 730 | 680 | 780 | 675 | 750 |
| SAG | | | | | | |
| 30' at 120° C. mm | 7 | 7 | 10 | 9.5 | 11 | 9 |
| 60' at 120° C. mm | 12 | 14 | 14 | 12.5 | 15 | 13 |

We claim:

1. A stable polyol composition for use in reaction injection moulding (RIM) processing of polyurethanes, said composition consisting essentially on a weight basis of:
   (a) 100 parts of a polymeric polyol selected from polyoxypropylene diols and triols and poly(oxypropyleneoxyethylene) diols and triols having hydroxyl equivalent weights of from 750 to 3000 and mixtures thereof;
   (b) 1 to 10 parts of a polysiloxane mould release agent which consists essentially of 0.5–20 mol % of $R_aR'_bSiO[4-(a+b)]/2$ units and from 99.5–80 mol % of $R''_cSiO(4-c)/2$ units
   where
   R is an isocyanate reactive organic radical,
   a has an average value of from 1–3,
   R' and R" are hydrocarbon radical or a substituted organic radical,
   b has an average value of 0–2,
   a+b is from 1–3,
   c has an average value from 1 to 3, whereas
      (i) the ratio of the total molecular weight to the total number of isocyanate reactive functional groups in the polysiloxane molecule ranges from 100–3500,
      (ii) the combined formula weights of all isocyanate reactive organic radicals R do not exceed 40% of the total molecular weight of the polysiloxane mould release agent,
      (iii) the combined formula weights of all non-isocyanate reactive radicals R' and R" together do not exceed 40% of the total molecular weight of the polysiloxane mould release agent;
   (c) 1 to 5 parts of an ethylene oxide based surfactant having the formula $$QO(CH_2CH_2O)_nH$$

wherein Q represents an alkyl, alkylphenyl or alkanoyl residue containing from 8 to 30 carbon atoms and n has an average value of from 20 to 150.

2. A stable polyol composition for use in reaction injection moulding (RIM) processing of polyurethanes, said composition consisting essentially on a weight basis of
   (a) 100 parts of a polymeric polyol selected from polyoxypropylene diols and triols and poly(oxypropyleneoxyethylene) diols and triols having hydroxyl equivalent weights of from 750 to 3000 and mixtures thereof;
   (b) 25 to 70 parts of a polysiloxane mould release agent which consists essentially of 0.5–20 mol % of $R_aR'_bSiO[4-(a+b)]/2$ units and from 99.5–80 mol % of $R''_cSiO(4-c)/2$ units
   where
   R is an isocyanate reactive organic radical,
   a has an average value of from 1–3,
   R' and R" are hydrocarbon radical or a substituted organic radical,
   b has an average value of 0–2,
   a+b is from 1–3,
   c has an average value from 1 to 3, whereas
      (i) the ratio of the total molecular weight to the total number of isocyanate reactive functional groups in the polysiloxane molecule ranges from 100–3500,
      (ii) the combined formula weights of all isocyanate reactive organic radicals R do not exceed 40% of the total molecular weight of the polysiloxane mould release agent,
      (iii) the combined formula weight of all non-isocyanate reactive radicals R' and R" together do not exceed 40% of the total molecular weight of the polysiloxane mould release agent;
   (c) 20 to 30 parts of an ethylene oxide based surfactant having the formula $$QO(CH_2CH_2O)_nH$$

wherein Q represents an alkyl, alkylphenyl or alkanoyl residue containing from 8 to 30 carbon atoms and n has an average value from 20 to 150.

3. A method for the preparation of a polyurethane which comprises reacting an organic polyisocyanate with a polyol composition according to claim 1.

4. A method for the preparation of a polyurethane which comprises reacting an organic polyisocyanate with a polyol composition according to claim 2.

* * * * *